Nov. 8, 1949 — V. S. THOMPSON — 2,487,398

VEHICLE TIRE

Filed March 21, 1947

Inventor:
Vincent S. Thompson
By Alex. E. MacRae
Attorney.

Patented Nov. 8, 1949

2,487,398

UNITED STATES PATENT OFFICE 2,487,398

VEHICLE TIRE

Vincent Swire Thompson, Ottawa, Ontario, Canada

Application March 21, 1947, Serial No. 736,279

9 Claims. (Cl. 152—209)

This invention relates to vehicle tires of the pneumatic type.

An object of the invention is to provide a tire of improved road-gripping and anti-skid properties, particularly on slippery surfaces such as are caused by ice and the like.

The invention contemplates the provision of a rubber tire having a plurality of teeth on its traction surface, each tooth having sufficient length and inherent flexibility of resiliency to permit a slight bending or shifting movement of the outer face of the tooth in a clockwise direction on normal tractive engagement of a road surface under the application of forward driving power, and to permit a converse movement under the application of braking or like power, in combination with the provision on at least the forward face of each tooth of a metal strip adapted to engage the traversed surface substantially only during such converse movement.

Figure 1:
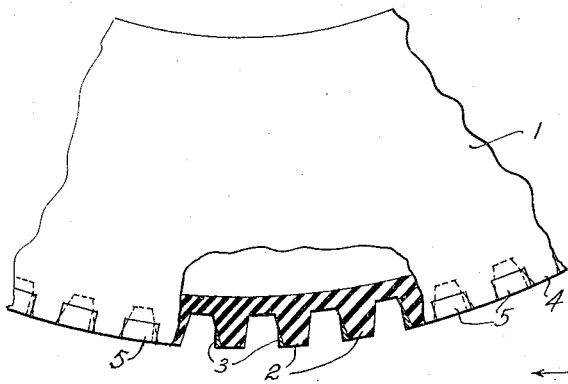
Figure 2:
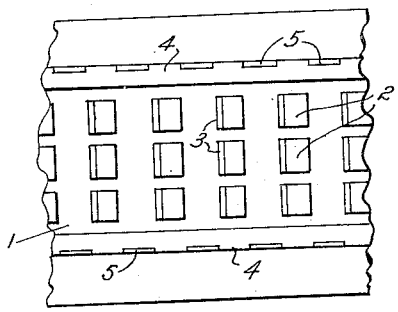
Figure 5:
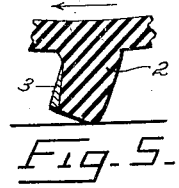
Figure 6:
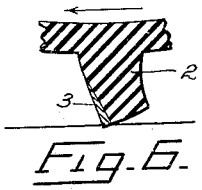
Figure 3:
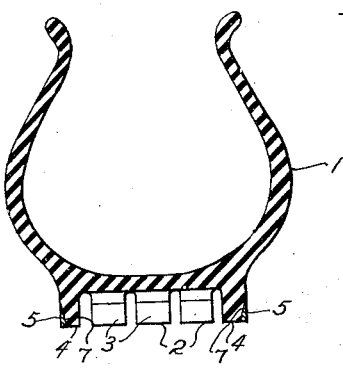
Figure 4:

The invention will be described with reference to the accompanying drawing, in which, Figure 1 is a side elevation, partly in section, of a portion of a tire constructed in accordance with the invention, Figure 2 is a partial plan view, Figure 3 is a cross-sectional elevation, Figure 4 is a partial longitudinal sectional elevation of a modified form of the invention, Figure 5 is an enlarged sectional elevation of a tooth in somewhat exaggerated traction-engaging relation with a surface under forward power, and Figure 6 is an enlarged sectional elevation of a tooth in somewhat exaggerated relation with a surface on application of braking power or the like.

In the drawing, 1 is a tire of ordinary pneumatic type and constructed in the usual manner from normal synthetic or natural rubber and associated materials. The traction or tread surface of the tire is provided with a plurality of individual rubber teeth 2 having forward and rearward surfaces lying in planes transversely of the tire. As shown in the example illustrated, a plurality of longitudinally spaced transverse rows of three teeth each are provided, but it will be understood that the number, spacing and relative position of the teeth may vary within wide limits.

Fixed to the forward face of each tooth is a small metal strip 3 of high grade steel or the like, having its lower edge in substantial alignment with the outer or road-engaging surface of the tooth. The strips are fixed to the teeth in any suitable manner as by cementing thereto with available cements for fixing metal to rubber such as that known under the trade name "Ty-ply." The strips may be plated with brass or the like, as desired.

As shown, each strip is of upwardly tapered form to provide an inclined lateral face for engagement with the complementarily tapered surface of the tooth face, and terminating in an upper knife edge a short distance below the base of the tooth. It will be understood, however, that the strip may be of any satisfactory shape subject to the presentation of an edge surface in substantial alignment with the normal tread surface of the tooth. The thickness of such edge surface is considerably less than the length of the tread surface of the tooth and generally will not be substantially greater than one-quarter of such length.

The tread portion of the tire may be provided also with a circumferential rib 4 on each side of the tread portion and having a tread surface in substantial transverse alignment with the tread surfaces of the teeth. At least a portion of the outer circumferential corner of the tread surface of each rib is provided with a metal insert, the lower edge of which lies in substantial alignment with the tread surface of the rib and the thickness of which is not substantially greater than the thickness of the remaining tread surface of the rib.

The metal insert comprises a plurality of segments 5. The inner rib-engaging surface 7 of the inserts may be tapered, as illustrated, the rib being complementarily recessed to receive the same. The inserts are cemented or otherwise fixed to the ribs. The recesses in the ribs may be conveniently formed during manufacture of the tire by temporarily fixing the metal inserts in proper position in the tire form. The segments 5 may be of identical shape and dimensions with the strips 3. Thus, the metal members 3 and 5 may be cut from strip metal of suitable cross-section to facilitate manufacturing procedure.

In accordance with the invention, the teeth 2 and ribs 4 are of sufficient depth and inherent flexibility that application of normal traction stress thereon by movement of the vehicle results in a slight bending movement thereon in the direction of vehicle movement or, in other words, in a slight shifting of the normal center of pressure on the teeth or ribs in a direction opposite to that of vehicle movement.

It will be understood, however, that the teeth must possess sufficient rigidity to withstand normal bending stresses which would tend to move the metal corner portions beyond effective gripping contact with the road surface. Thus, the desirable flexibility may be defined as sufficient to permit movement, on application of normal tractive stress, of the outer end of the tooth longitudinally out of its normal position a distance which is but a slight fraction of the width of the outer face of the tooth and in no case greater than one half of said width.

In operation of a vehicle equipped with tires in accordance with the invention, on forward movement of the vehicle, under application of normal driving power, a slight bending of each tooth occurs as it comes into contact with the road surface, as shown in exaggerated form in Figure 5, wherein the arrow indicates direction of vehicle movement. As a consequence, the metal strips 3 have little or no contact with the road surface during normal forward movement and thus the tire is not subject to the usual disadvantages of armored tires wherein there is metal to road contact. Upon application of braking power or when the vehicle overruns its motor, a slight bending of the teeth occurs in the opposite direction whereby the forward metal corner portions of the teeth are placed in gripping contact with the road surface, as shown in exaggerated form in Figure 6. In operating a vehicle, it is contemplated that the driver will apply only sufficient braking power to cause a mild gripping action between the metal corners and the road surface, such action being sufficient in most instances to ensure the desired deceleration of the vehicle.

The outer armored corners of the ribs 4 are provided to eliminate side slipping or skidding such as may result should sufficient braking power be applied to lock the wheels of the vehicle and cause a sharp contact between the metal corners on the teeth and the roadway. In such a case, the ribs will bend in a direction opposite to that of the lateral movement of the vehicle and the armored corners on the ribs on one side of the tires will exert a gripping action on the road surface to prevent side slip.

The modification shown in Figure 4 is similar to the structure illustrated in the other figures but includes in addition the provision of metal strips 8 on the rearward face of the teeth 2. Such a structure may be desirable in certain instances where an accentuated traction effect is necessary, but it does not provide the substantially exclusively rubber traction surface during advancing movement of the vehicle, as does the preferred form.

There has thus been provided a substantially non-skid tire wherein metal armored portions are utilized to provide gripping contact with a road surface but wherein such armored portions constitute a very minor portion of the traction surface of the tire.

I claim:

1. A vehicle tire of the pneumatic rubber type comprising a body portion and a tread portion, said tread portion having a plurality of radially projecting rubber teeth presenting a rubber tread surface on the outer faces of the teeth and having forward and rearward faces lying in planes substantially transversely of the tire, and a metal strip adhesively secured in fixed relation to the forward face of each tooth, said strip being circumferentially spaced throughout its extent from the opposed rearward face of the next adjacent tooth, the lower edge of said strip lying substantially flush with said outer face, each said tooth possessing sufficient flexibility to permit bending movement of the outer end of the tooth on normal tractive engagement with a road surface.

2. A vehicle tire as defined in claim 1, wherein the thickness of said lower edge of the strip is a fraction of the circumferential width of said outer face of the tooth.

3. A vehicle tire as defined in claim 1, wherein the thickness of said lower edge of the strip is not substantially greater than one-quarter of the circumferential width of said outer face of the tooth.

4. A vehicle tire as defined in claim 1, wherein the thickness of said strip decreases gradually upwardly from said lower edge.

5. A vehicle tire of the pneumatic rubber type having a body portion and a tread portion, said tread portion having a plurality of radially projecting rubber teeth presenting a rubber tread surface on the outer faces of the teeth, and having forward and rearward faces lying in planes substantially transversely of the tire, and a metal strip cemented in fixed relation to the forward face of each tooth, said strip being circumferentially spaced throughout its extent from the opposed rearward face of the next adjacent tooth, the lower edge of said strip lying substantially flush with said outer face, each said tooth possessing flexibility to permit movement of the outer face of the tooth on normal tractive engagement with a road surface, the extent of said movement being at least a quarter of the circumferential width of said outer face and not greater than said circumferential width.

6. A vehicle tire as defined in claim 5, wherein said tread portion also includes a pair of circumferential rubber ribs laterally spaced from said teeth and having outer faces lying in substantially the same transverse plane as that of the outer faces of said teeth, each said rib having a plurality of recesses in its outer corner, and a metal insert in each of said recesses and adhesively secured to the rib.

7. A vehicle tire of the pneumatic rubber type having a body portion and a tread portion, said tread portion having a plurality of radially projecting rubber teeth presenting a rubber tread surface on the outer faces of the teeth, and having forward and rearward faces lying in planes substantially transversely of the tire, and a metal strip adhesively secured in fixed relation to the forward face of each tooth, said strip being circumferentially spaced throughout its extent from the opposed rearward face of the next adjacent tooth, the lower edge of said strip lying substantially flush with said outer face and having a thickness which is but a fraction of the circumferential width of said outer face, the entire rearward faces of said teeth having their rubber surfaces exposed.

8. A vehicle tire of the pneumatic rubber type having a body portion and a tread portion, said tread portion having a plurality of radially projecting rubber teeth presenting a rubber tread surface on the outer faces of the teeth and having forward and rearward faces lying in planes substantially transversely of the tire, and metal strips fixed to the forward and rearward faces of each tooth, the lower edges of said strips lying substantially flush with said outer face.

9. A vehicle tire of the pneumatic rubber type having a body portion and a tread portion, said tread portion comprising a plurality of radially projecting rubber teeth presenting a rubber tread surface on the outer faces of the teeth and having forward and rearward faces lying in planes substantially transversely of the tire, and a metal strip adhesively secured in fixed relation to the forward face of each tooth, said strip being circumferentially spaced throughout its extent from the opposed rearward face of the next adjacent tooth, the lower edge of said strip lying substantially flush with said outer face and having a thickness not substantially greater than one-quarter of the circumferential width of said outer face, said strip providing an outer metal corner area on the forward portion of the tooth, the rearward face of each tooth having its rubber surface exposed to present an outer rubber corner area on the rearward portion of the tooth, each said tooth possessing sufficient flexibility to permit bending movement of the outer end of the tooth on normal tractive engagement with a road surface, said bending movement causing substantial disengagement of one of said corner areas with the road surface.

VINCENT SWIRE THOMPSON.

REFERENCES CITED

The following references are of record in the file of this patent:

UNITED STATES PATENTS

| Number | Name | Date |
| --- | --- | --- |
| 1,413,190 | Rapson | Apr. 18, 1922 |
| 2,121,740 | Kraft | June 21, 1938 |
| 2,186,180 | Sloman et al. | Jan. 9, 1940 |
| 2,207,098 | Maynard | July 9, 1940 |
| 2,354,715 | Tarbox | Aug. 1, 1944 |